United States Patent
Salem et al.

(10) Patent No.: US 11,100,930 B1
(45) Date of Patent: Aug. 24, 2021

(54) AVOIDING FALSE TRIGGER OF WAKE WORD FROM REMOTE DEVICE DURING CALL

(71) Applicant: Facebook, Inc., Menlo Park, CA (US)

(72) Inventors: Marc Ihaab Salem, Sunnyvale, CA (US); Timothy M. McCune, Los Gatos, CA (US)

(73) Assignee: Facebook, Inc., Menlo Park, CA (US)

( * ) Notice: Subject to any disclaimer, the term of this patent is extended or adjusted under 35 U.S.C. 154(b) by 197 days.

(21) Appl. No.: 16/589,705

(22) Filed: Oct. 1, 2019

Related U.S. Application Data

(60) Provisional application No. 62/742,170, filed on Oct. 5, 2018.

(51) Int. Cl.
| | | |
|---|---|---|
| *G10L 15/22* | (2006.01) |
| *H04M 9/08* | (2006.01) |
| *G10L 21/0232* | (2013.01) |
| *G10L 15/08* | (2006.01) |
| *G10L 21/0208* | (2013.01) |

(52) U.S. Cl.
CPC .............. *G10L 15/22* (2013.01); *G10L 15/08* (2013.01); *G10L 21/0232* (2013.01); *H04M 9/082* (2013.01); *G10L 2015/088* (2013.01); *G10L 2015/223* (2013.01); *G10L 2021/02082* (2013.01)

(58) Field of Classification Search
CPC ..... G10L 15/22; G10L 15/08; G10L 21/0232; G10L 2015/088; G10L 2015/223; G10L 2021/02082; H04M 9/082
See application file for complete search history.

(56) References Cited

U.S. PATENT DOCUMENTS

| | | | |
|---|---|---|---|
| 9,530,410 B1 * | 12/2016 | LeBeau | G10L 15/22 |
| 9,600,231 B1 * | 3/2017 | Sun | G10L 15/02 |
| 9,692,895 B1 * | 6/2017 | Ouimette | H04M 3/5175 |
| 10,079,015 B1 * | 9/2018 | Lockhart | G10L 15/08 |
| 10,186,265 B1 * | 1/2019 | Lockhart | G10L 15/32 |
| 10,194,027 B1 * | 1/2019 | Daddi | H04M 3/5175 |
| 10,573,321 B1 * | 2/2020 | Smith | G10L 15/30 |
| 10,586,534 B1 * | 3/2020 | Argyropoulos | G10L 15/22 |
| 10,586,538 B2 * | 3/2020 | Kurtz | G10L 21/0216 |
| 10,593,328 B1 * | 3/2020 | Wang | G10L 15/18 |

(Continued)

*Primary Examiner* — Mohammad K Islam
(74) *Attorney, Agent, or Firm* — Fenwick & West LLP

(57) ABSTRACT

A method for wake word detection during a communication session includes receiving a local audio signal from a microphone of a local communication device, the microphone capturing sound from a local environment of a local communication device, and receiving a far-end audio signal from a far-end communication device on a far-end of the communication session, the far-end communication device connected to the local communication device during the communication session. A first occurrence of a wake sound in the local audio signal is detected, and responsive to detecting the first occurrence of the wake sound in the local audio signal and determining that the far-end audio signal does not contain a second occurrence of the wake sound within a threshold period of time from the first occurrence, activation signal is transmitted to a controller. The activation signal causes a processor associated with the communication device to perform an operation.

17 Claims, 3 Drawing Sheets

| First Input Signal (From Microphone/AEC Module) | Second Input Signal (From Far-End Communication) | Send Activation Signal? |
|---|---|---|
| contains "wake" | contains "wake" | no |
| contains "wake" | does not contain "wake" | yes |
| does not contain "wake" | contains "wake" | no |
| does not contain "wake" | does not contain "wake" | no |

(56) References Cited

U.S. PATENT DOCUMENTS

| | | | |
|---|---|---|---|
| 10,748,536 B2* | 8/2020 | Mori | G10L 15/08 |
| 10,762,896 B1* | 9/2020 | Yavagal | G10L 15/183 |
| 10,777,189 B1* | 9/2020 | Fu | G10L 15/30 |
| 2018/0204569 A1* | 7/2018 | Nadkar | G10L 15/22 |
| 2019/0005953 A1* | 1/2019 | Bundalo | G10L 15/22 |
| 2019/0214036 A1* | 7/2019 | Wurtz | G10L 15/20 |
| 2019/0362719 A1* | 11/2019 | Gruenstein | G10L 15/063 |
| 2020/0098386 A1* | 3/2020 | Smith | G10L 25/03 |
| 2020/0111493 A1* | 4/2020 | Takei | G10L 15/1822 |

* cited by examiner

| First Input Signal (From Microphone/AEC Module) | Second Input Signal (From Far-End Communication) | Send Activation Signal? |
|---|---|---|
| contains "wake" | contains "wake" | no |
| contains "wake" | does not contain "wake" | yes |
| does not contain "wake" | contains "wake" | no |
| does not contain "wake" | does not contain "wake" | no |

FIG. 3

AVOIDING FALSE TRIGGER OF WAKE WORD FROM REMOTE DEVICE DURING CALL

CROSS-REFERENCE TO RELATED APPLICATION

This application claims priority to U.S. Provisional Patent Application No. 62/742,170, filed on Oct. 5, 2018, which is hereby incorporated in its entirety.

BACKGROUND

Field of Art

The present disclosure relates to a communication device capable of performing wake word detection for the activation of a task during live two-way audio or audio-video communication.

Description of the Related Art

In smart home devices and audio assistant devices, a wake word is often used by a local user to prompt the activation of a task. In many cases, the task may be to activate audio recording of the local user. During live two-way audio or audio-video communication performed on such a smart home device or audio assistant device, audio communication with a user on a far-end may cause undesired activation of the task. For example, the user on the far-end may say the wake word during the live two-way communication. This may cause the smart home device or audio assistant device to mistakenly detect the local user as having said the wake word, if a microphone or audio input on the device captures the speech of the user on the far-end that includes the wake word.

Some smart home devices and audio assistant devices solve this problem by deactivating the function of wake word detection during live two-way audio or audio-video communication. A smart home device or audio assistant device may also use acoustic echo cancellation to try to remove an audio signal provided by a user on the far-end from an audio signal captured locally by the microphone or input, during live two-way communication. However, in many cases this is not sufficient for preventing erroneous wake word detection from occurring. For example, acoustic echo cancellation techniques may not be successful in completely removing the audio signal provided by the user on the far-end from the audio signal captured locally by the microphone or input. In this case, the wake word detector may erroneously detect the wake word and active the task due to the user on the far-end.

SUMMARY

Embodiments of the present disclosure relate to a communication device capable of performing wake sound detection for the activation of a task during live two-way audio or audio-video communication with another communication device on a far-end of the communication session over a communication network. The communication device allows a wake sound captured by a microphone in the local environment of the communication device to be detected and then activates the corresponding task, while preventing detection of a wake sound that is received from a far-end device over the communication network. Beneficially, the communication device accomplishes this without turning off the local wake sound detector (also referred to herein as a "wake sound detection module"), enabling the user to activate the corresponding tasks even during live two-way audio or audio-video communication sessions. In some embodiments, the wake sound is a wake word or phrase verbally expressed by a user.

The communication device prevents the communication device from erroneously detecting a wake word received from the far-end device by using an audio circuit including a dual-input wake sound detector. In one embodiment, the dual-input wake sound detector accepts an audio signal at each of a first input and a second input. A first input audio signal provided at the first input is a local audio signal provided from a microphone or audio input device local to the communication device. A second input audio signal provided at the second input is a far-end audio signal provided by the communication device on a far-end of the audio or audio-video communication session. The dual-input wake sound detector sends an activation signal to a controller to activate the task only when an occurrence of the wake sound is detected at the first input and determines that the second input audio signal does not contain the wake sound within a threshold period of time from occurrence of the wake word detected at the first input. If the wake word is also detected at the second input within the time threshold, the dual-input wake word detector determines not to send the activation signal to activate the task.

Embodiments of the present disclosure thus relate to a communication device that prevents the erroneous detection of a wake word for activating a task during live two-way audio or audio-video communication. By using a dual-input wake sound detector that only activates the task when the wake sound is detected at a first input and not a second input, the communication device enables a smart home device or an audio assistant device to perform accurate wake sound detection during live two-way audio or audio-video communication. This allows the smart home device or the audio assistant device to perform features that require wake sound detection simultaneously with the live two-way audio or audio-video communication.

BRIEF DESCRIPTION OF DRAWINGS

FIG. 3 is a table illustrating the logic of the wake word detector in determining whether to transmit an activation signal to a controller of a client device, according to some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

I. System Architecture

Figure 1:
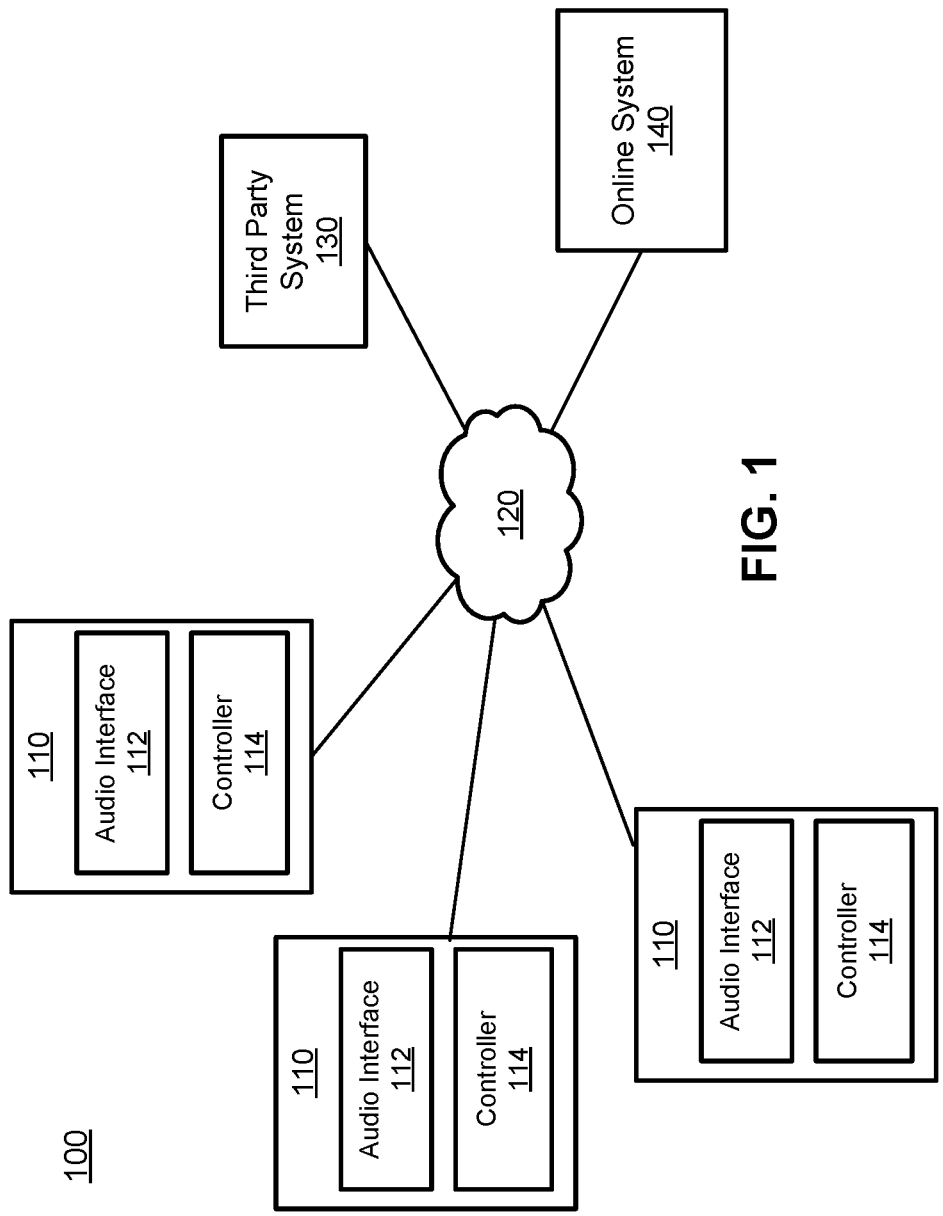
FIG. 1 is a block diagram of a system environment for an online system and one or more client devices, according to some embodiments.

FIG. 1 is a block diagram of a system environment 100 for an online system 140 and one or more client devices 110, according to some embodiments. The system environment 100 shown by FIG. 1 comprises one or more client devices 110, a network 120, one or more third-party systems 130, and the online system 140. Additionally, in the system environment 100 shown by FIG. 1, a controller is coupled to a client device 110. In alternative configurations, different and/or additional components may be included in the system environment 100. For example, the online system 140 is a social networking system, a content sharing network, or another system providing content to users.

The client devices 110 (also referred to herein as a "communication device") are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 3, a client device 110 includes an audio interface 112 configured to receive audio signals, receive audio communications, transmit audio communications, present audio content, and provide instructions to the controller. A client device 110 may engage in live two-way audio or audio-video communication with another communication device on a far-end of the communication session over the network 120, according to some embodiments. For example, the communication device on the far-end may be an embodiment of the client device 110.

As discussed below, with respect to FIG. 3, the audio interface 112 may be connected to a local audio input of the client device 110 (also referred to herein, as a "microphone") which captures audio from a local environment of the client device 110. The audio interface 112 may also be connected to a local audio output of the client device 110 (also referred to herein, as a "speaker") which outputs audio content, including audio communications, into the local environment. The microphone and/or the speaker may not be physically coupled to the client device 110. For example, the microphone and/or the speaker may be a part of a headset associated with the client device 110. The audio interface 112 may be connected to a communication interface of the client device 110. The communication interface may connect the client device 110 to one or more other client devices 110, for audiovisual communication, according to some embodiments. In some embodiments, the communication interface connects the client device 110 to one or more other client devices 110 for audio communication without video. The audio interface 112 is connected to a controller 114, according to some embodiments.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

The controller 114 is connected to the audio interface 112 and comprises a storage device coupled to a processor. In various embodiments, the controller 114 is connected to other components of the client device 110. In some embodiments, the controller 114 provides instructions to a processor of the client device 110 to perform an operation, in response to receiving an activation signal from the audio interface 112. For example, a wake word detector of the audio interface 112 may transmit the activation signal to the controller 114, in response to a local user saying a predetermined phrase, also referred to herein as a "wake word."

Figure 2:
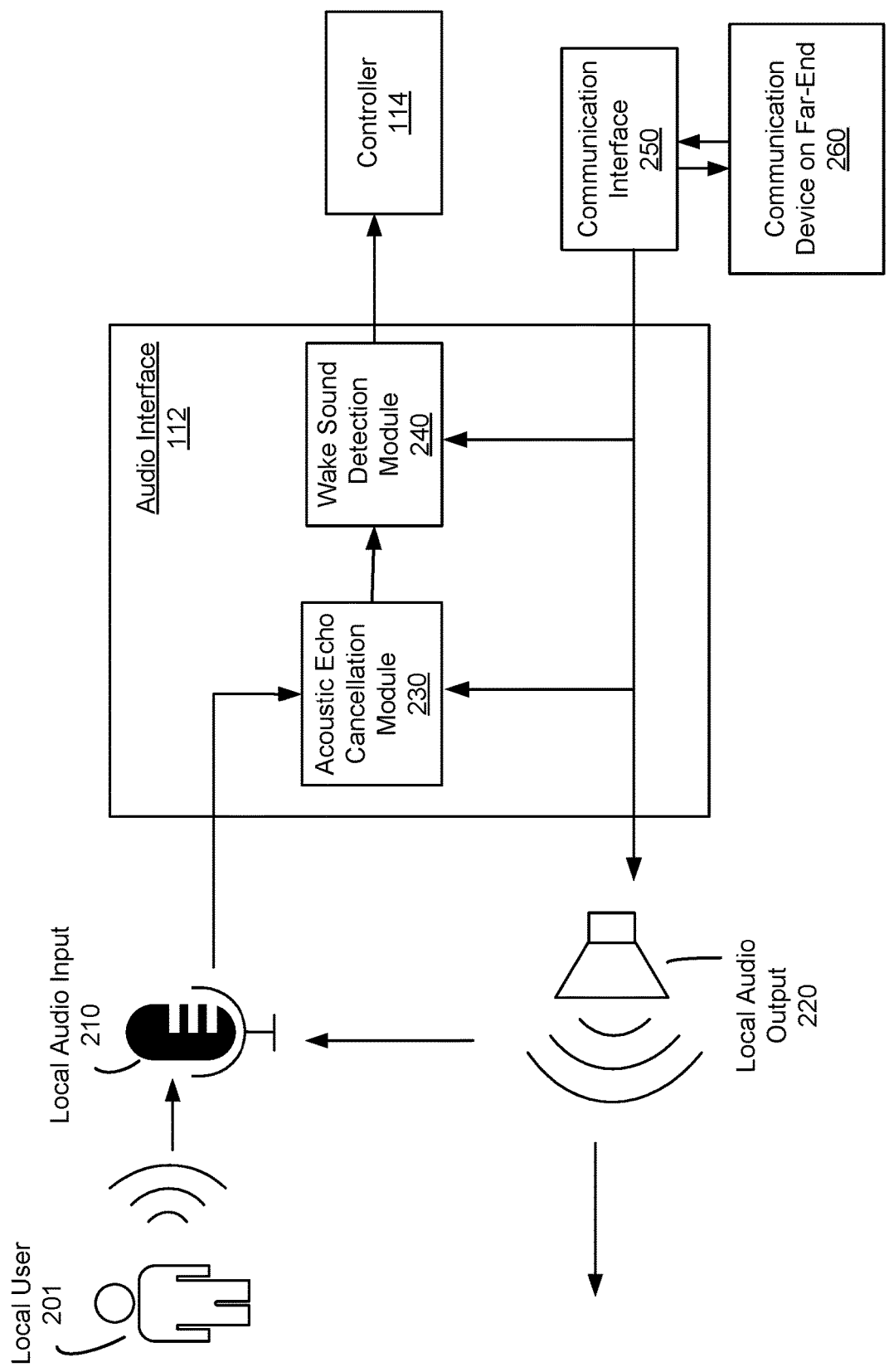
FIG. 2 is an interaction diagram for the audio interface of a client device, illustrating interactions between components of the audio interface and other components of the client device, according to some embodiments.

FIG. 2 is an interaction diagram for the audio interface 112 of a client device 110, illustrating interactions between components of the audio interface 112 and other components of the client device 110, according to some embodiments. According to some embodiments, the client device 110 has multiple functions including, but not limited to acting as a smart home device or an audio assistant device. The client device 110 also functions to provide live two-way audio or audio-visual communication between users that are remote from each other.

The client device 110 includes a local audio input 210 (also referred to herein as a "microphone" 210) configured to capture and record audio on a near-end, where a local user 201 communicates to the device verbally, and a local audio output 220 (also referred to herein as a "speaker" 220) configured to output sound in to the local environment of the client device 110. The microphone 210 and the speaker 220 are connected to the audio interface 112. In some embodiments, the speaker 220 is in a vicinity of the microphone 210.

The audio interface 112 includes an acoustic echo cancellation (AEC) module 230 and a dual-input wake sound detection module 240 (also referred to as a "wake word detector" 240). The output of the microphone 210 is connected to a first input of the AEC module 230, and the output of the AEC module 230 is connected to a first input of the wake word detector 240 and, although not shown in FIG. 2, a communication interface 250 of the client device 110. In some embodiments, the output of the microphone 210 is connected directly to an input of the wake word detector 240. For example, the output of the microphone 210 may be connected to the first input of the wake word detector 240, instead of the output of the AEC module 230. A communication device on a far-end 260 provides an audio signal to the communication interface 250, which provides the audio signal to a speaker 220 of the client device 110, a second input of the AEC module 230, and a second input of the wake word detector 240. The communication device on the far-end 260 may send the audio signal to the communication interface 250 via a network connection, for example by voice-over IP using an internet connection.

The wake word detector 240 is connected to a controller 114, and the controller 114 is configured to perform an operation, in response to receiving an activation signal from the wake word detector 240. When the desired conditions are met, for example the user saying a wake word in the vicinity of the microphone 210, the wake word detector 240 will send an activation signal to the processor to begin a task. In some embodiments, the wake word detector 240 detects an occurrence of a wake sound in the audio signals received at the first input and the second input of the wake word detector 240, and based on the detected occurrences of the wake sound, transmits or withholds the activation signal to the controller 114. For example, the task may involve capturing audio through the microphone 210, to receive a command verbally expressed by the local user 201. A function of the wake word detector is to prevent activation of the task by audio received from the communication device on the far-end 260 and to ensure that only audio from the local user 201 or the local user's environment will activate the initiation of the operation (also referred to herein as a "task"). By using the dual input wake word detector of the present disclosure, the communication device can perform wake word detection and live two-way audio communication simultaneously with accurate wake word detection. Although in the examples provided below, the wake sound may be a word or a phrase uttered by a user, in other embodiments, the wake sound may be a different sound.

During live two-way audio or audio-video communication, the local user 201 may use the client device 110 for audio and/or audio-video communication to the communication device on the far-end 260. The live two-way audio or audio-video communication may involve a user on the far-end using the communication device on the far-end 260. The local user 201 may simultaneously speak in order to both command the audio interface 112 to activate a task and to verbally communicate to the user on the far-end.

The output from the AEC module 230 is connected to the communication interface. The AEC module 230 modifies the output signal from the microphone 210, removing an audio signal provided by the communication device on the far-end 260. The modified output signal from the microphone 210 is provided by the AEC module 230 to the input of the communication interface 250. The communication interface 250 then sends the modified output signal to the communication device on the far-end 260, via a network connection. The modified output signal aids in preventing audio provided by the speaker 220 from being communicated back to the communication device on the far-end 260 which can cause an echo effect or feedback on the far-end. Thus, the client device 110 and the communication device on the far-end 260 may each experience a reduced echo effect during live two-way audio communication.

In some embodiments, the output of the AEC module 230 is also connected in parallel with the output of the microphone 210 to the first input of the wake word detector 240. In this case, the AEC module 230 also modifies the output of the microphone 210 before it reaches the first input of the wake word detector 240. In other embodiments, the microphone 210 is connected to the first input of the wake word detector 240, without the AEC module 230 intervening. The audio interface 112 may include only the wake word detector 240 and not include the AEC module 230, according to some embodiments. In this case, the output of microphone 210 is connected to the first input of the wake word detector 240 and the communication interface 250.

II. Operation of the Audio Device

FIG. 3 illustrates the logic of the wake word detector 240 in determining whether to send an activation signal to the controller 114 to begin a task, according to some embodiments. In this example, a desired condition for sending the activation signal is the local user 201 saying the word "wake." A function of the wake word detector 240 is to prevent the erroneous activation of the task, during live two-way communication. If a far-end user says the word "wake" which is captured by the communication device on the far-end 260, the microphone 210 may capture audio of the far-end user saying "wake" from the speaker 220. The wake word detector 240 prevents this from activating the task.

FIG. 3 shows a table showing the logic for the dual-input wake word detection module. Following the example above, the activation condition for the wake word detector 240 is the local user 201 saying a word "wake." In other embodiments, the activation condition for the wake word detector is a different sound being captured by the microphone 210. The wake word detector 240 will check both a first input audio signal at the first input of the wake word detector 240 and a second input audio signal at the second input audio signal of the wake word detector 240 for an audio signal corresponding to an utterance of the word "wake."

If the first input audio signal contains the word "wake" and the second signal contains the word "wake" within a threshold time of the occurrence of the word "wake" in the first input audio signal, the wake word detector 240 will not transmit the activation signal to the controller 114. If the first input audio signal contains the word "wake" and the second signal does not contain the word "wake" within the threshold time from the occurrence of the word "wake" in the first input audio signal, the wake word detector 240 transmits the activation signal to the controller 114. If the first input audio signal does not contain the word "wake," the wake word detector 240 will not send the activation signal, regardless of the second input audio signal.

In one embodiment, the wake word detector 240 is always listening at the second input (i.e., from the far-end communication). In another embodiment, the wake word detector 240 is triggered only when the wake word is detected at the first input (i.e., from the microphone 210). This may help to save power consumption by activating a reduced amount of the circuitry of the wake word detector 240.

In some embodiments, the wake word detector 240 performs wake sound detection on a single input audio signal from one source at a time. In further embodiments, the wake word detector 240 may have a single audio input. For example, the wake word detector 240 may receive the local audio signal from the microphone 210 (or the modified local audio signal from the AEC module 230) and perform wake sound detection on the local audio signal. Upon detecting an occurrence of the wake sound in the local audio signal from the microphone 210, the wake word detector 240 stops the wake sound detection on the local audio signal. The wake word detector 240 then receives far-end audio signal data from the from the communication device on the far-end 260 that is within a threshold period of time from the occurrence of the wake sound in the local audio signal. If the far-end audio signal data does not include the wake sound, the wake word detector 240 transmits the activation signal to the controller 114. The wake word detector 240 may then resume receiving the local audio signal from the microphone 210 (or the modified local audio signal from the AEC module 230) and performing wake sound detection on the local audio signal. According to some embodiments, this may reduce the required computing resources needed to perform the wake sound detection during a live two-way audio communication session.

III. Additional Considerations

The figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising, during a communication session:
   receiving a local audio signal from a microphone of a local communication device, the microphone capturing sound from a local environment of a local communication device;
   receiving a far-end audio signal from a far-end communication device on a far-end of the communication session, the far-end communication device connected to the local communication device during the communication session;
   detecting a first occurrence of a wake sound in the local audio signal;
   responsive to detecting the first occurrence of the wake sound in the local audio signal and determining that the far-end audio signal does not contain a second occurrence of the wake sound within a threshold period of time from the first occurrence, transmitting an activation signal to a controller, wherein the activation signal causes a processor associated with the communication device to perform an operation;
   detecting a second occurrence of the wake sound in the local audio signal;
   analyzing the far-end audio signal to determine whether the far-end audio signal contains the wake sound; and
   responsive to detecting the second occurrence of the wake sound in the local audio signal and determining that the far-end audio signal contains the wake sound within a threshold period of time from the second occurrence, determining not to transmit an activation signal to the controller.

2. The method of claim 1, further comprising during the communication session:
   outputting sound through a speaker associated with the local communication device based at least on the received far-end audio signal.

3. The method of claim 2, wherein the speaker is in a vicinity of the microphone of the local communication device.

4. The method of claim 3, further comprising:
   before detecting the first occurrence of the wake sound in the local audio signal, modifying the received local audio signal based on the received far-end audio signal using an acoustic echo cancellation module, wherein the modified local audio signal has a reduced echo, the echo caused by the outputted sound from the speaker being captured by the microphone.

5. The method of claim 1, wherein the operation comprises:
   capturing a verbal command using a microphone associated with the local communication device;
   determining a task corresponding to the captured verbal command; and
   performing the task.

6. The method of claim 1, further comprising:
   analyzing the local audio signal to determine whether the local audio signal contains the wake sound;

detecting a second occurrence of the wake sound in the far-end audio signal; and responsive to detecting the second occurrence of the wake sound in the far-end audio signal and determining that the local audio signal does not contain the wake sound within a threshold period of time from the second occurrence, determining not to transmit an activation signal to the controller.

7. The method of claim 1, wherein the controller is associated with a smart home device.

8. The method of claim 1, wherein the wake sound is a word or a phrase uttered by a user.

9. The method of claim 1, wherein the received local audio signal captures speech from a user in the local environment of the local communication device, and the received far-end audio signal captures speech from a user on the far-end.

10. A communication device comprising:
a microphone configured to convert sound from a local environment into local audio signals;
a communication interface configured to transmit audio communication signals and receive audio communication signals during a communication session;
a speaker configured to emit sound based at least on the received audio communication signals; and
a wake sound detection module configured to:
receive the local audio signals from the microphone,
receive the received audio communication signals from the communication interface,
detect an occurrence of a wake sound in the local audio signals,
analyze the received audio communication signal to determine whether the received audio communication signals contain the wake sound,
responsive to detecting the occurrence of the wake sound in the local audio signals and determining that the received audio communication signals do not contain the wake sound within a threshold period of time from the occurrence of the wake sound in the local audio signals, transmitting an activation signal to a controller, wherein the activation signal causes a processor associated with the communication device to perform an operation, and
responsive to detecting the occurrence of the wake sound in the local audio signals and determining that the received audio communication signals contain the wake sound within a threshold period of time from the occurrence of the wake sound, the wake sound detection module determines not to transmit the activation signal to the controller.

11. The communication device of claim 10, wherein the speaker is positioned within a vicinity of the microphone.

12. The communication device of claim 10, further comprising an acoustic echo cancellation module configured to:
receive the local audio signals from the microphone,
receive the received audio communication signals from the communication interface,
modify the local audio signals based on the received audio communication signals, and
transmit the modified local audio signals to the wake sound detection module and the communication interface, wherein
the modified local audio signals have a reduced echo, the echo caused by emitted sounds from the speaker being captured by the microphone.

13. The communication device of claim 10, wherein the controller is associated with a smart home device.

14. The communication device of claim 10, wherein the local audio signals capture speech from a user in the local environment of the communication device, and the received audio communication signals capture speech from a user on a far-end of the communication session.

15. The communication device of claim 10, wherein the wake sound is a word or a phrase uttered by a user.

16. A non-transitory computer readable storage medium storing executable instructions that, when executed by one or more processors, cause the one or more processors to perform steps comprising:
detecting a first occurrence of a wake sound in a local audio signal of an audio communication session;
determining whether a far-end audio signal received from a far-end of the audio communication session contains the wake sound within a threshold period of time from the first occurrence of the wake sound;
responsive to detecting the first occurrence of the wake sound and determining that the far-end audio signal does not contain the wake sound within a threshold period of time from the first occurrence of the wake sound, transmitting an activation signal to a controller; and
responsive to detecting the first occurrence of the wake sound and responsive to determining that the far-end audio signal contains the wake sound within the threshold period of time from the first occurrence of the wake sound, determining not to transmit the activation signal to the controller.

17. The non-transitory computer readable storage medium of claim 16, the steps further comprising:
detecting a second occurrence of the wake sound in the far-end audio signal; and
responsive to determining that the local audio signal does not contain the wake sound within a threshold period of time from the second occurrence, determining not to transmit the activation signal to the controller.

* * * * *